(12) United States Patent
Vyletel et al.

(10) Patent No.: US 11,187,288 B2
(45) Date of Patent: Nov. 30, 2021

(54) VEHICLE BRAKE COMPONENT FOR COLLECTING BRAKE DUST

(71) Applicant: Federal-Mogul Motorparts LLC, Southfield, MI (US)

(72) Inventors: Gregory Michael Vyletel, Ann Arbor, MI (US); John David Holme, Llaneilian (GB)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 103 days.

(21) Appl. No.: 16/528,262

(22) Filed: Jul. 31, 2019

(65) Prior Publication Data

US 2021/0033157 A1 Feb. 4, 2021

(51) Int. Cl.
*F16D 65/00* (2006.01)

(52) U.S. Cl.
CPC .................... *F16D 65/0031* (2013.01)

(58) Field of Classification Search
CPC .................................. F16D 65/0031
See application file for complete search history.

(56) References Cited

U.S. PATENT DOCUMENTS

| | | | |
|---|---|---|---|
| 2,988,173 A | 6/1961 | Romine | |
| 6,186,285 B1 * | 2/2001 | Parsons | F16D 65/092 188/250 E |
| 6,592,642 B2 | 7/2003 | Maricq et al. | |
| 8,025,132 B2 | 9/2011 | Krantz | |
| 8,544,615 B2 | 10/2013 | Martinez | |
| 8,926,738 B2 | 1/2015 | Lupica et al. | |
| 2002/0166311 A1 | 11/2002 | Maricq | |
| 2004/0099488 A1 | 5/2004 | Sano | |
| 2013/0174656 A1 | 7/2013 | Mackelvie | |
| 2014/0262633 A1 * | 9/2014 | Kunzler | F16D 65/0081 188/72.1 |
| 2018/0031059 A1 * | 2/2018 | Gelb | F16D 65/0031 |

FOREIGN PATENT DOCUMENTS

| | | | | |
|---|---|---|---|---|
| CN | 205951934 U | * | 2/2017 | .......... F16D 65/847 |
| DE | 102016217387 A1 | | 3/2018 | |
| DE | 102017007429 A1 | * | 4/2018 | ........ F16D 65/0031 |
| DE | 102017007429 A1 | | 4/2018 | |
| DE | 102017201736 A1 | | 8/2018 | |

(Continued)

OTHER PUBLICATIONS

EPO machine translation, JP 2007-218333. (Year: 2007).*
International Search Report and Written Opinion issued for PCT/US2020/042958 dated Oct. 30, 2020.

*Primary Examiner* — Thomas J Williams
(74) *Attorney, Agent, or Firm* — Reising Ethington, P.C.

(57) ABSTRACT

A vehicle brake component for collecting brake dust that includes a body having a leading edge portion and a trailing edge portion, and a magnet having a collection side, an adherence side, and one or more side edges separating the collection side and the adherence side. The collection side is configured to collect brake dust by directly facing the rotor, and the adherence side is directly coupled to the body at the trailing edge portion. In one embodiment, the body of the vehicle brake component is a backing plate body of a brake pad, and in another embodiment, the body of the vehicle brake component is a caliper housing or a caliper bracket.

19 Claims, 4 Drawing Sheets

(56) References Cited

FOREIGN PATENT DOCUMENTS

| EP | 2151596 A1 | | 2/2010 | | |
|---|---|---|---|---|---|
| EP | 2309146 A1 | | 4/2011 | | |
| FR | 2751390 A1 | | 1/1998 | | |
| FR | 3090057 A1 | * | 6/2020 | ......... | F16D 65/0031 |
| JP | 11311272 A | * | 11/1999 | | |
| JP | 2004263712 A | | 9/2004 | | |
| JP | 2007218333 A | | 8/2007 | | |
| KR | 980010000 A | * | 4/1998 | | |
| KR | 1019980010000 A | | 4/1998 | | |
| WO | WO8102690 A1 | | 10/1981 | | |
| WO | WO9901325 A1 | | 1/1999 | | |
| WO | WO2011034431 A1 | | 3/2011 | | |
| WO | WO-2020058596 A1 | * | 3/2020 | ......... | F16D 65/0031 |

\* cited by examiner

VEHICLE BRAKE COMPONENT FOR COLLECTING BRAKE DUST

TECHNICAL FIELD

This invention generally relates to automotive brakes and, in particular, to braking systems having brake components such as brake pads and calipers for collecting brake dust.

BACKGROUND

Recent research has investigated brake particle emission into the environment from both a chemical and physical (e.g., size and quantity) perspective. Limiting brake dust and particle emissions can be beneficial for the environment. Reduction of overall particle emission from a brake system can accordingly be desirable. Filtering systems are currently being designed and promoted to collect emitted wear debris, but those systems often include more drastic, and/or potentially more expensive, modifications to the brake components.

SUMMARY

According to one embodiment, there is provided a vehicle brake component for collecting brake dust, comprising: a body having a leading edge portion and a trailing edge portion; and a magnet having a collection side, an adherence side, and one or more side edges separating the collection side and the adherence side, wherein the collection side is configured to collect brake dust by directly facing the rotor, and wherein the adherence side is directly coupled to the body at the trailing edge portion.

According to various embodiments, the vehicle brake component may further include any one of the following features or any technically-feasible combination of these features:
- the body is a backing plate body and the leading edge portion is located between a leading edge of the backing plate and an outer perimeter of a friction pad and the trailing edge portion is located between a trailing edge of the backing plate and the outer perimeter of the friction pad;
- the friction pad has a chamfer which decreases in thickness toward the magnet and the trailing edge portion;
- at least one of the one or more side edges of the magnet directly touches an outer perimeter of the friction pad;
- the magnet has a rectangular profile;
- a second magnet coupled to a body of the friction pad;
- the second magnet is located within a groove that is recessed from a friction surface of the friction pad;
- a thickness of the magnet is less than a wear-out limit of the friction pad;
- the body is a caliper housing body;
- the body is a caliper bracket body;
- a second magnet having a collection side, an adherence side, and one or more side edges separating the collection side and the adherence side, wherein the adherence side of the second magnet is directly coupled to the body at the leading edge portion;
- a second magnet having a collection side, an adherence side, and one or more side edges separating the collection side and the adherence side, wherein the adherence side of the second magnet is directly coupled to the body at the trailing edge portion;
- an air gap is situated between at least one of the one or more side edges of the first magnet and at least one of the one or more side edges of the second magnet;
- the first magnet has a cylindrical profile and the second magnet has a cylindrical profile;
- a third magnet having a collection side, an adherence side, and one or more side edges separating the collection side and the adherence side, wherein the adherence side of the third magnet is directly coupled to the body at the trailing edge portion; and/or
- the collection side of the magnet is configured to directly face a braking surface of the rotor.

According to another embodiment, there is provided a vehicle brake component for collecting brake dust, comprising: a backing plate body having an outboard facing surface and an inboard facing surface; a friction pad body having a friction surface, the friction pad body being attached to the inboard facing surface of the backing plate body; and a magnet having a collection side and an adherence side, wherein the collection side is configured to collect brake dust by directly facing the rotor, and wherein the adherence side is directly coupled to the inboard facing surface of the backing plate body.

According to various embodiments, this vehicle brake component may further include a caliper housing body having a second magnet for collecting brake dust, and a caliper bracket body having a third magnet for collecting brake dust.

According to another embodiment, there is provided a vehicle brake component for collecting brake dust, comprising: a caliper housing body having a leading edge and a trailing edge; a caliper bracket body having a leading edge portion and a trailing edge portion; a first magnet having a collection side and an adherence side, wherein the collection side of the first magnet is configured to collect brake dust by directly facing the rotor, and wherein the adherence side of the first magnet is directly coupled to the trailing edge portion of the caliper housing body; and a second magnet having a collection side and an adherence side, wherein the collection side of the second magnet is configured to collect brake dust by directly facing the rotor, and wherein the adherence side of the second magnet is directly coupled to the trailing edge portion of the caliper bracket body.

According to various embodiments, this vehicle brake component may further include a backing plate body carried by the caliper bracket body within the caliper housing body, wherein the backing plate body includes a third magnet located on an inboard surface of the backing plate body.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The vehicle brake components disclosed herein may be used in various braking assemblies and in various vehicle applications to help minimize brake dust emissions. The vehicle brake components include one or more magnets strategically positioned to magnetically attract a portion, or in some instances, a majority, of the wear debris emitted from the friction surfaces of the braking system. Oftentimes, the brake particle emission is a combination of brake pad wear debris as well as rotor or brake disc debris. The incorporation of a strong magnet directly with the brake pad backing plate, the caliper housing, and/or the caliper bracket allow for the collection of brake dust while minimizing expensive or undesirable modifications to the overall braking system. Thus, the embodiments described herein may be easier to manufacture and more adaptable to a number of different braking systems, as implementing the structural configurations described herein can oftentimes be easier than other magnetic-based collection or filtering systems.

Figure 1:
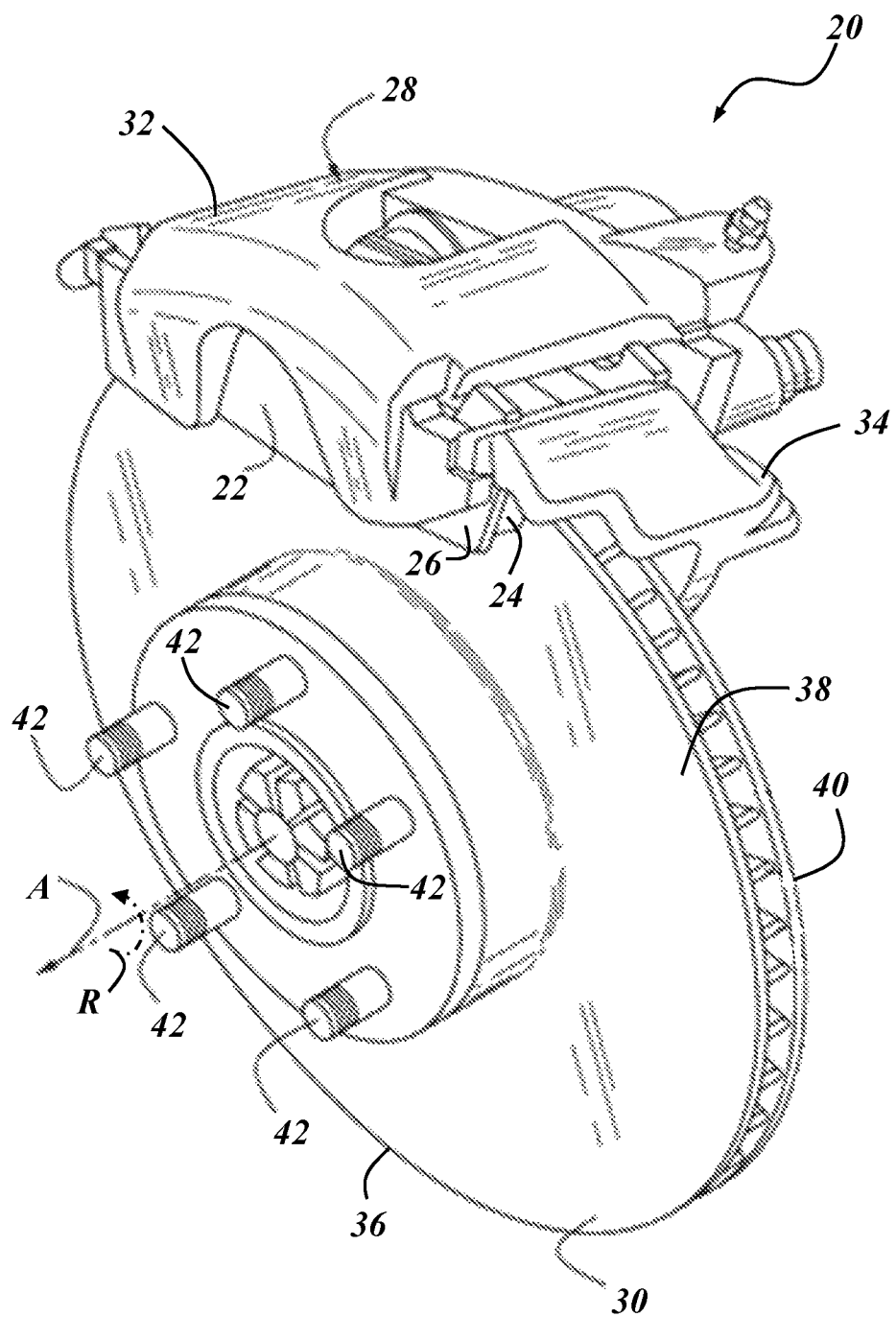
FIG. 1 illustrates a braking system in accordance with one embodiment.

FIG. 1 illustrates one embodiment of a braking system 20. Braking system 20 is a disc braking system that uses a rotatable brake element in the form of a rotor 30. However, the vehicle brake components described herein may be adapted for or used with other braking systems, such as drum braking systems that use a metal drum as the rotatable brake element. The braking system 20 includes a brake pad 22 having a friction pad 24 and a backing plate 26. The caliper assembly 28 holds the brake pad 22 and another brake pad (not shown) on opposing sides of rotor 30. The caliper assembly 28 includes a caliper housing 32 and a caliper bracket 34, and may be any operable type of caliper assembly, such as floating, sliding, or fixed. The rotor 30 has an outer perimeter 36, planar braking surfaces 38, 40, and is connected to an axle hub via lug bolts 42. A vehicle wheel (not shown) can be attached over lug bolts 42 so that it rotates about central axis A, and forward motion of the wheel is indicated in the FIG. 1 example by the arrow R. The illustrated rotor 30 is ventilated; however, this is not necessary as any operable rotor design may be employed, such as generally planar rotors or slotted rotors, to cite a few examples. In operation, the friction pads 24 are clamped against opposing braking surfaces 38, 40 of the rotor 30 to inhibit rotation of the vehicle wheel. As will be detailed further below, vehicle brake components of the braking system 20, such as the friction pad 24, backing plate 26, caliper housing 32, and/or caliper bracket 34, are modified so as to promote the collection of brake dust during operation of the braking system 20. A vehicle brake component is a functional component of the braking system 20 that is configured to move toward and away from the rotor 30 during application and release of the vehicle brakes.

FIGS. 2-5 illustrate various embodiments of brake pads 22. In these embodiments, the brake pads 22 may be considered vehicle brake components, and separately, each of the friction pads 24 and the backing plates 26 may be considered vehicle brake components. The illustrated backing plate 26 configuration and friction pad 24 configuration are just an example, as other geometries, features, etc., may be possible depending on factors such as the design of the caliper assembly 28. Further, other features such as shims, damping layers, clips, springs, etc. may be included that are not particularly illustrated in the figures.

The rotor 30 is used as an example herein to positionally describe one or more features of the vehicle brake components such as the brake pad 22. Accordingly, directional terms such as inboard and outboard may be used to describe whether a component faces toward one of the planar braking surfaces 38, 40 of the rotor 30 (e.g., inboard) or away from one of the planar braking surfaces 38, 40 (e.g., outboard) when the brake pad 22 is installed. The phrase "directly facing" as used herein generally means that one component or a portion of a component directly opposes another component or a portion of another component without another component or a portion of a component therebetween. Oftentimes, two components or portions of components that are directly facing include an air gap therebetween (e.g., an air gap exists between the friction pad 24 and the braking surface 38 of the rotor 30 when the brakes are not applied, but are able to directly contact one another and close the air gap when the brakes are applied).

The friction pad 24 has a friction pad body 44, which includes an inboard-facing friction surface 46 and an outboard-facing attachment surface 48. The attachment surface 48 directly faces and is attached to the backing plate 26, although other layers such as an adhesive layer, another attachment or interlayer, etc. may be included. The friction pad 24 may be made from any operable material, such as a non-asbestos organic (NAO) material, a ceramic material, or a semi-metallic material (e.g., about 30-65 wt % metal). In one implementation, the friction pad 24 may include ferrous material that is more likely to be collected by the magnets of the dust collection system, as detailed further below. In the embodiments illustrated in FIGS. 3 and 5, there is a primary friction pad body 44 and a secondary friction pad body 50 that are generally demarcated by a centrally extending groove 52. Each of the primary and secondary friction pad bodies 44, 50 have a common outboard-facing attachment surface 48, but the inboard-facing friction surface 46 is divided symmetrically with respect to the groove 52. The groove 52 extends deeper into the friction pad body 44 than typical cooling grooves or slots, such as the slots 54. Unlike the slots 54 which have a curved profile 56, the groove 52 has a rectilinear profile 58 having a base surface 60 that is situated below the wear limit of the friction pad body 44.

The backing plate 26 is typically a steel plate, the configuration of which is dictated by the needs of the braking system 20 and/or the design of the caliper assembly 28. Other materials for the backing plate 26 are certainly possible, such as cast iron to cite one example. Further, other features, shapes, materials, etc. besides those illustrated and described may be employed for the backing plate 26, such as additional caliper attachment projections, eye holes, mold holes, etc., to cite a few examples. The backing plate 26 has a backing plate body 62, which includes an inboard surface 64, an outboard surface 66, and an outer perimeter 68.

In the embodiments illustrated in FIGS. 2-5, each of the brake pads 22 includes one or more magnets 70-86. The magnets 70-86 are advantageously permanent magnets, which allows for easier manufacture and operation than other magnet types, such as electromagnets, although it may be possible to implement the various brake components described herein with electromagnets or other magnet types. The following description generally focuses on magnet 70, which is the only magnet having subcomponents that are labeled in FIGS. 2-5 for clarity purposes, but the features and subcomponents of the magnet 70 are generally applicable to the other magnets 72-86 unless otherwise stated.

The magnet 70 includes a collection side 88, an adherence side 90, and one or more side edges 92, 94, 96, 98 that separate the collection side 88 from the adherence side 90. The magnet 70 in each of FIGS. 2 and 3 has a rectilinear or rectangular profile 100 with four side edges 92-98, whereas the magnet 70 in each of FIGS. 4 and 5 has a cylindrical profile 102 with only a single side edge 92. It is not necessary to have a rectangular profile or a cylindrical profile, as other profile shapes and side edge configurations are certainly possible. The collection side 88 of each magnet is configured to collect brake dust by directly facing the rotor 30, and the adherence side 90 of each magnet is directly coupled to the backing plate body 62 and/or the friction pad body 44.

The magnet 70 is attached to a trailing edge portion 104 of the backing plate body 62. The trailing edge portion 104 is closer to a trailing edge 106 of the brake pad 22, whereas the leading edge portion 108 is closer to a leading edge 110 of the brake pad 22. The friction pad 24 is located between the trailing edge portion 104 and the leading edge portion 108, and accordingly an outer perimeter 112 of the friction pad 24 generally demarcates the inner edges of the trailing edge portion 104 and the leading edge portion 108, respectively. The trailing edge 106 is located towards the rear of the vehicle and the leading edge 110 is located towards the front of the vehicle when the brake pad 22 is installed. The trailing edge portion 104 is generally situated downstream of the rotor rotation R such that a majority of the braking activity encourages air and dust flow opposite to the rotor rotation R. Accordingly, the trailing edge portion 104 of the brake pads 22 illustrated in FIGS. 2-5 generally corresponds to the brake pad 22 that is shown installed in FIG. 1. Locating the magnet 70 at the trailing edge portion 104 of the backing plate body 62 is particularly advantageous, as it can better collect dust and particulate matter as it flows from the friction pad 24. Experiments have shown that entrained dust generally includes elements found in the friction pad 24 and not in the rotor 30. However, the magnets may also collect dust from the braking surfaces 38, 40 of the rotor 30. Further, experiments have shown that dust collection with the magnets directly at the trailing edge portion 104 can be better at collecting smaller or very fine dust particles (e.g., particle sizes that are tens of nanometers).

The trailing edge portion 104 of the backing plate body 62 is generally situated between the trailing edge 106 and a closest portion of the outer perimeter 112 of the friction pad 24. Similarly, the leading edge portion 108 of the backing plate body 62 is generally situated between the leading edge 110 and a closest portion of the outer perimeter 112 of the friction pad 24. In the embodiments illustrated in FIGS. 3 and 5, where there are primary and secondary friction pad bodies 44, 50, there is a trailing edge portion 114 located in the centrally extending groove 52. Accordingly, it is possible for the friction pad body 44 to have a trailing edge portion 114 to help promote dust collection as the friction surface 46 of the secondary friction pad body 50 wears away during operation.

Figure 2:
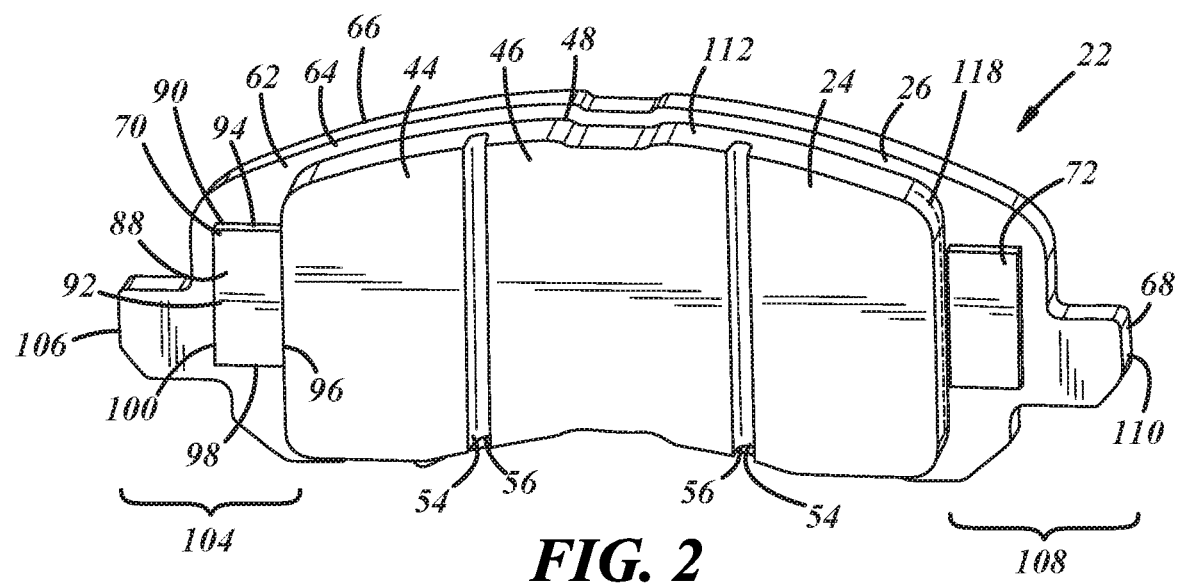
FIG. 2 shows a brake pad for a braking system, such as the braking system of FIG. 1, in accordance with one embodiment.
Figure 3:
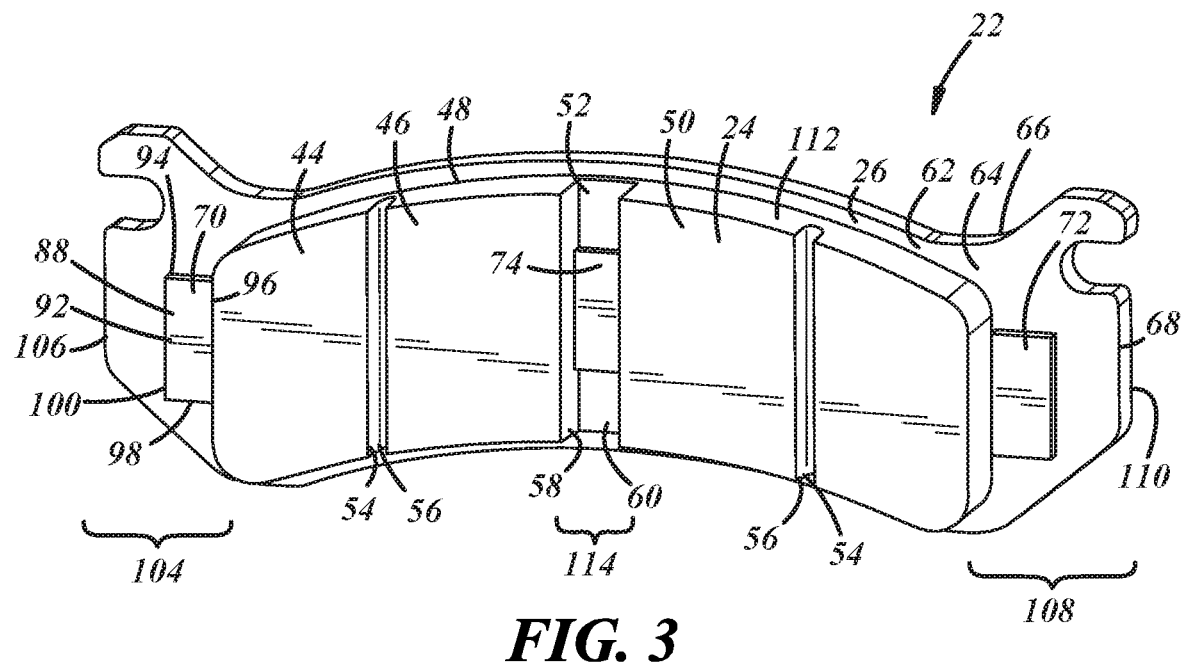
FIG. 3 shows a brake pad for a braking system, such as the braking system of FIG. 1, in accordance with another embodiment.

Some embodiments may include a vehicle brake component or brake pad 22 that has a symmetrical distribution of magnets, such as the embodiments illustrated in FIGS. 2-5. However, in other embodiments, there may only be one or more magnets located at the trailing edge portion 104, to cite one example. In FIG. 2, there is a magnet 70 directly adhered at its adherence side 90 to the outboard surface 66 of the backing plate body 62 at the trailing edge portion 104, as well as a second magnet 72 directly adhered at its adherence side to the outboard surface 66 of the backing plate body 62 at the leading edge portion 108. In FIG. 3, in addition to the magnets 70, 72, there is a third magnet located in the trailing edge portion 114 of the friction pad body 44, where the adherence side is directly attached to the base surface 60 of the centrally extending groove 52. In some embodiments, such as those illustrated in FIGS. 2 and 3, it may be beneficial for the one or more side edges, such as side edge 96, to directly abut or contact the outer perimeter 112 of the friction pad 24. This arrangement locates the magnet 70 closer to the friction pad 24, which can help promote dust collection. However, in some embodiments, one or more magnets may be spaced from the outer perimeter 112 of the friction pad 24. In some implementations, it is advantageous to have a plurality or a set of magnets that conform to an outer perimeter 112 of the friction pad 24 at either the trailing edge portion 104, the leading edge portion 108, or both.

Figure 4:
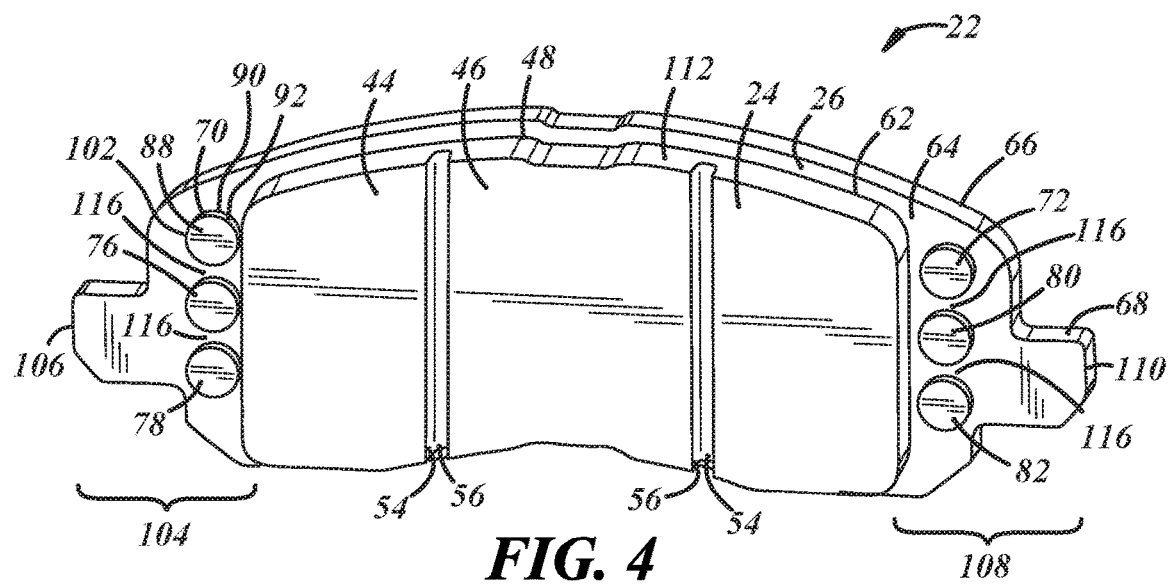
FIG. 4 shows a brake pad for a braking system, such as the braking system of FIG. 1, in accordance with yet another embodiment.
Figure 5:
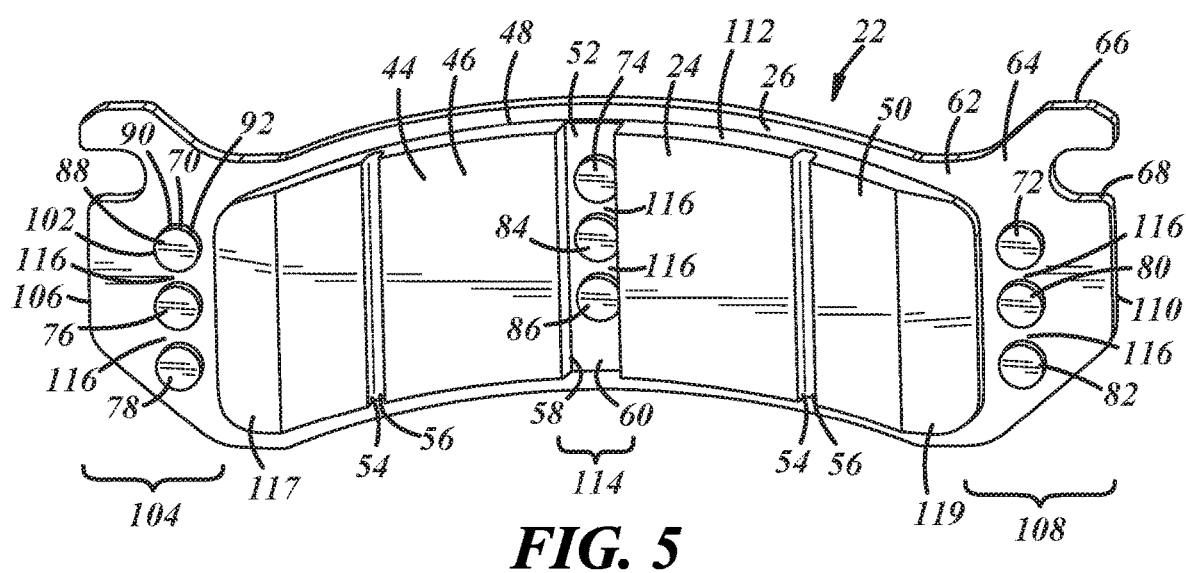
FIG. 5 shows a brake pad for a braking system, such as the braking system of FIG. 1, in accordance with yet another embodiment.

FIGS. 4 and 5 also have a symmetrical distribution of magnets, although it is possible with cylindrical magnets as well to only have magnets on the trailing edge portion 104. In FIGS. 4 and 5, there are multiple magnets 70, 76, 78 that are directly affixed to the outboard surface 66 of the backing plate body 62 at the trailing edge portion 104. Between the first magnet 70 and the second magnet 76, as well as between the second magnet 76 and the third magnet 78, there is an air gap 116. The leading edge portion 108 has a similar arrangement with multiple magnets 72, 80, 82 with air gaps 116 located therebetween. This air gap 116 configuration may be desirable in implementations with magnets having the cylindrical profile 102, and can also promote additional collection of brake dust along the side edge 92 of each magnet as air can flow along the air gap 116 between each magnet. In the embodiment of FIG. 5, there are three magnets 74, 84, 86 located in the trailing edge portion 114 of the friction pad body 44, which are also situated to include an air gap 116.

Through the use of permanent magnets, such as magnets 70-86, it is possible to directly adhere the magnets to a portion of the brake pad 22 that directly faces the rotor 30, without expensive or undue modifications to the overall structure of the brake pad. The adherence side 90 of each magnet may be glued, adhered, or otherwise coupled to the body 44, 62 of the vehicle brake component. In some embodiments, such as those illustrated in FIGS. 3 and 5, the shape of the friction pad 24 is modified to accommodate magnet attachment. Additionally, the width of the friction pad 24 between the trailing edge 106 and the leading edge 110 may be decreased to provide for a larger trailing edge portion 104 and a larger leading edge portion 108 for magnet attachment. However, in some embodiments, the friction pad shape may be unmodified. Further, it is possible for one or more of the magnets 70-86 to be recessed into the respective body 44, 62. Such an arrangement may promote stronger attachment of the magnet to the vehicle component.

The thickness of each magnet 70-86, which is generally defined as the length or height of the sidewall 92 between the collection side 88 and the adherence side 90, is advantageously less than a wear-out limit 118, which is schematically illustrated with a dotted line along a side of the outer perimeter 112 of the friction pad 24 illustrated in FIG. 2, adjacent the magnet 72. This size of the wear-out limit 118 will depend on a number of factors, such as the type of material used for the friction pad 24, the specifications of the braking system 20, etc. Having the thickness of the magnet be less than the wear-out limit can help prevent magnetic interference between the brake pad 22 and the rotor 30 and potential damage to the rotor. Further, this thickness can allow for additional dust adherence along the collection side 88 of each magnet without interfering with braking performance. In one embodiment, the magnet thickness is about 0.5-4 mm, or even more preferably 1.5-2.5 mm. Even more preferably, the magnet thickness is about 1.5-2.0 mm extending from the inboard surface 64 of the backing plate 26. A thicker magnet may be used in larger vehicle applications (e.g., trucks), such as when the friction pad 24 and the underlayer have a combined thickness of about 20-25 mm. A thinner magnet may be used in passenger vehicle applications, such as when the friction pad 24 and the underlayer have a combined thickness of about 9-13 mm.

The friction pad 24 embodiment illustrated in FIG. 5 includes two chamfers 117, 119 near the trailing edge portion 104 and the leading edge portion 108, respectively. The two chamfers 117, 119 decrease the thickness of the friction pad 24 so that it gradually decreases from the primary inboard-facing friction surface 46 and the secondary friction surface 50 toward the magnets 70, 72, 76, 78, 80, 82. This chamfer arrangement can encourage dust and particulate flow from the friction surfaces 46, 50 to the magnets (particularly magnets 70, 76, 78 at the trailing edge portion 104).

Figure 6:
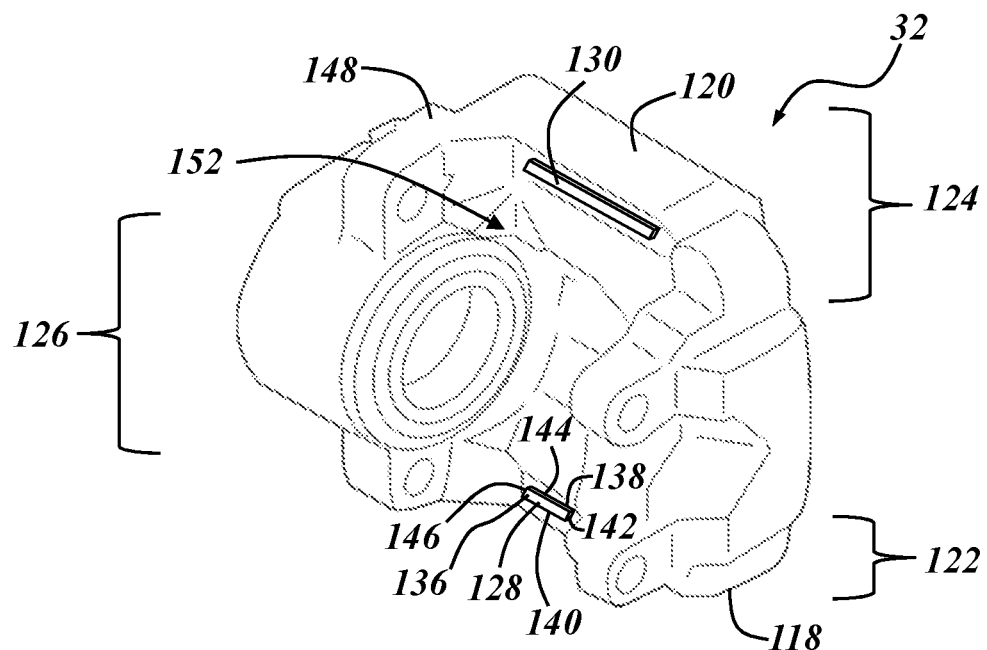
FIG. 6 shows a caliper housing for a braking system in accordance with one embodiment.
Figure 7:
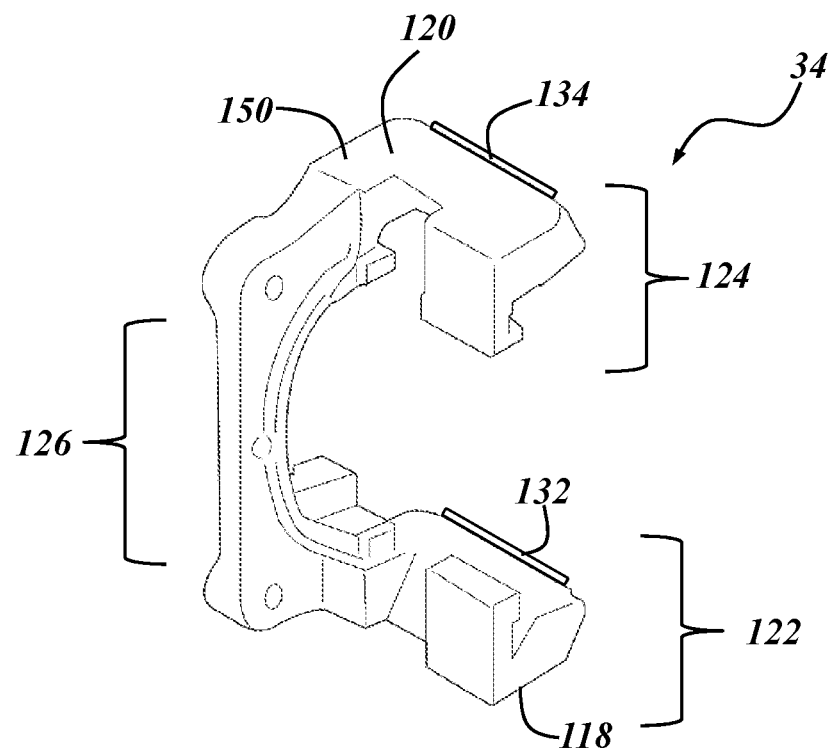
FIG. 7 shows a caliper bracket for a braking system in accordance with one embodiment.

FIGS. 6 and 7 illustrate vehicle brake components including a caliper housing 32 and a caliper bracket 34, respectively. The design of the caliper housing 32 and the caliper bracket 34 is different than the caliper assembly 28 illustrated in FIG. 1, but the trailing edge 118 and leading edge 120 arrangement generally correspond to the orientation of vehicle brake components illustrated in FIG. 1. In the embodiments illustrated in FIGS. 6 and 7, the trailing edge portion 122 and the leading edge portion 124 correspond to the areas between the trailing edge 118 and the piston portion 126, and the leading edge 120 and the piston portion, respectively. The caliper housing 32 illustrated in FIG. 6 includes a magnet 128 at the trailing edge portion 122, as well as a magnet 130 at the leading edge portion 124. The caliper bracket 34 illustrated in FIG. 7 includes a magnet 132 at the trailing edge portion 122, as well as a magnet 134 at the leading edge portion 124. It is possible, however, to have other magnet configurations, such as only a single magnet or a set of magnets located at the trailing edge portion 122, without any magnets at the leading edge portion 124.

Like the magnet 70, each magnet 128-134 includes a collection side 136, an adherence side 138, and one or more side edges 140-146 (the sides 136-146 are labeled on magnet 128 only for clarity purposes). The adherence side 138 is directly adhered to the caliper housing body 148 and the caliper bracket body 150. Teachings with regard to the magnets 70-86 and the bodies 44, 62 are generally applicable to the magnets 128-124 and the bodies 148, 150. The collection side 136 of each magnet 128-134 is oriented such that a portion of each directly faces the outer perimeter 36 of the rotor 30. Additionally, each collection side 136 of each magnet 128-134 generally faces an interior region 152 of the caliper assembly 28, which is generally shielded from the external environment. Having magnets on vehicle brake components of both the brake pad 22 as well as the caliper assembly 28 can provide a filtering system that encapsulates the majority and/or entirety of the brake corner.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A vehicle brake component for collecting brake dust, comprising:
   a planar body having a leading edge portion and a trailing edge portion; and
   a magnet having a collection side, an adherence side, and one or more side edges separating the collection side and the adherence side, wherein the collection side is configured to collect brake dust by directly facing a rotor, and wherein the adherence side is directly coupled to the body at the trailing edge portion, and wherein at least one of the one or more side edges of the magnet directly touches an outer perimeter of a friction pad at the trailing edge portion or the adherence side is directly attached to the friction pad, wherein a thickness of the magnet is less than a wear-out limit of the friction pad, and wherein the wear-out limit of the friction pad is a smaller portion of a thickness of the friction pad.

2. The vehicle brake component of claim 1, wherein the body is a backing plate body and the leading edge portion is located between a leading edge of the backing plate and the outer perimeter of the friction pad and the trailing edge portion is located between a trailing edge of the backing plate and the outer perimeter of the friction pad.

3. The vehicle brake component of claim 2, wherein the friction pad has a chamfer which decreases in thickness toward the magnet and the trailing edge portion.

4. The vehicle brake component of claim 2, further comprising a second magnet coupled to a body of the friction pad.

5. The vehicle brake component of claim 4, wherein the second magnet is located within a groove that is recessed from a friction surface of the friction pad.

6. The vehicle brake component of claim 1, wherein the magnet has a rectangular profile.

7. The vehicle brake component of claim 1, wherein the body is a caliper housing body.

8. The vehicle brake component of claim 1, wherein the body is a caliper bracket body.

9. The vehicle brake component of claim 1, further comprising a second magnet having a collection side, an adherence side, and one or more side edges separating the collection side and the adherence side, wherein the adherence side of the second magnet is directly coupled to the body at the leading edge portion.

10. The vehicle brake component of claim 1, further comprising a second magnet having a collection side, an adherence side, and one or more side edges separating the collection side and the adherence side, wherein the adherence side of the second magnet is directly coupled to the body at the trailing edge portion.

11. The vehicle brake component of claim 10, wherein an air gap is situated between at least one of the one or more side edges of the first magnet and at least one of the one or more side edges of the second magnet.

12. The vehicle brake component of claim 11, wherein the first magnet has a cylindrical profile and the second magnet has a cylindrical profile.

13. The vehicle brake component of claim 10, further comprising a third magnet having a collection side, an adherence side, and one or more side edges separating the collection side and the adherence side, wherein the adherence side of the third magnet is directly coupled to the body at the trailing edge portion.

14. The vehicle brake component of claim 1, wherein the collection side of the magnet is configured to directly face a braking surface of the rotor.

15. A vehicle brake component for collecting brake dust, comprising:
a friction pad;
a planar body having a leading edge portion and a trailing edge portion; and
a magnet having a collection side, an adherence side, and one or more side edges separating the collection side and the adherence side, wherein the collection side is configured to collect brake dust by directly facing a rotor, and wherein the adherence side is directly coupled to the body at the trailing edge portion wherein a thickness of the magnet is less than a wear-out limit of the friction pad, and wherein the wear-out limit of the friction pad is a smaller portion of a thickness of the friction pad.

16. A vehicle brake component for collecting brake dust, comprising:

a backing plate body having an outboard facing surface and an inboard facing surface;
a friction pad body having a friction surface, the friction pad body being attached to the inboard facing surface of the backing plate body;
a magnet having a collection side and an adherence side, wherein the collection side is configured to collect brake dust by directly facing the rotor, and wherein the adherence side is directly coupled to the inboard facing surface of the backing plate body, the friction pad body having a chamfer which decreases in thickness toward the magnet and toward the backing plate body, with the magnet being located directly adjacent the chamfer;
a caliper housing body having a second magnet for collecting brake dust; and
a caliper bracket body having a third magnet for collecting brake dust.

17. A vehicle brake component for collecting brake dust, comprising:
a caliper body having a leading edge portion, a trailing edge portion, and a piston portion between the leading edge portion and the trailing edge portion;
a first magnet having a collection side and an adherence side, wherein the collection side of the first magnet is configured to collect brake dust by directly facing the rotor, and wherein the adherence side of the first magnet is directly coupled to the trailing edge portion of the caliper body; and
a second magnet having a collection side and an adherence side, wherein the collection side of the second magnet is configured to collect brake dust by directly facing the rotor, and wherein the adherence side of the second magnet is directly coupled to the leading edge portion of the caliper.

18. The vehicle brake component of claim 17, further comprising a backing plate body, wherein the backing plate body includes a third magnet located on an inboard surface of the backing plate body.

19. The vehicle brake component of claim 17, wherein the caliper body is a caliper housing body or a caliper bracket body.

* * * * *